US010678517B1

(12) United States Patent
Tripp et al.

(10) Patent No.: US 10,678,517 B1
(45) Date of Patent: Jun. 9, 2020

(54) USER INTERFACE SYNTHESIS BASED UPON EXTRACTED PRESENTATION DOCUMENT GRAPHICAL FEATURES

(71) Applicant: International Business Machines Corporation, Armonk, NY (US)

(72) Inventors: Omer Tripp, Sunnyvale, CA (US); Joseph Ligman, Wilton, CT (US); Marco Pistoia, Amawalk, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/245,522

(22) Filed: Jan. 11, 2019

(51) Int. Cl.
*G06F 3/048* (2013.01)
*G06F 8/34* (2018.01)
*G06F 3/0484* (2013.01)
*G06F 8/38* (2018.01)

(52) U.S. Cl.
CPC .............. *G06F 8/34* (2013.01); *G06F 3/0484* (2013.01); *G06F 8/38* (2013.01)

(58) Field of Classification Search
None
See application file for complete search history.

(56) References Cited

U.S. PATENT DOCUMENTS

| 6,714,219 | B2 | 3/2004 | Lindhorst et al. | |
|---|---|---|---|---|
| 8,671,352 | B1* | 3/2014 | Hsu | G06F 40/197 715/762 |
| 2002/0089539 | A1 | 7/2002 | Lindhorst et al. | |
| 2006/0236917 | A1* | 10/2006 | Denda | H05K 3/02 117/60 |
| 2009/0282065 | A1* | 11/2009 | Brimble | G06F 16/38 |
| 2014/0223414 | A1* | 8/2014 | Mau | G06F 8/34 717/109 |
| 2014/0289700 | A1* | 9/2014 | Srinivasaraghavan | G06F 8/34 717/106 |
| 2016/0103800 | A1* | 4/2016 | Girault | G06F 40/30 715/236 |
| 2018/0074659 | A1* | 3/2018 | Anderson | G06F 8/38 |

FOREIGN PATENT DOCUMENTS

WO      9305472 A1    3/1993

\* cited by examiner

*Primary Examiner* — Thanh T Vu
(74) *Attorney, Agent, or Firm* — Garg Law Firm, PLLC; Rakesh Garg; Anthony Curro

(57) ABSTRACT

A presentation document specifying a graphical layout of a user interface is received. A processor extracts a first user interface graphical feature from the presentation document. The extracted first user interface graphical feature is matched to one or more first candidate user interface graphical features to determine a first selected candidate user interface graphical feature. A user interface code representation of the user interface is synthesized based upon the first selected candidate user interface graphical feature.

20 Claims, 7 Drawing Sheets

USER INTERFACE SYNTHESIS BASED UPON EXTRACTED PRESENTATION DOCUMENT GRAPHICAL FEATURES

TECHNICAL FIELD

The present invention relates generally to a method, system, and computer program product for synthesizing user interfaces for applications. More particularly, the present invention relates to a method, system, and computer program product for user interface synthesis based upon extracted presentation document graphical features.

BACKGROUND

User interface (UI) design is the design of user interfaces for software applications for computers, mobile devices, and other electronic devices. User interface design focuses on maximizing usability and the user experience for a user interacting with the electronic device. A graphical user interface (GUI) is a form of user interface that allows user to interact with an electronic device through graphical icons and other visual indicators instead of text-based user interfaces. The actions in a GUI are typically performed through direct manipulation of graphical elements. Typically, users interact with information by manipulating visual widgets. A widget is an element of interaction of a GUI, such as a button or a scroll bar, that a user manipulates to perform an action associated with a software application. Software developers often use an integrated development environment (IDE) to code UIs for applications. An IDE is a software application that provides facilities to software developers for software development such as a source code editor, build automation tools, a debugger, and various tools to simplify the construction of a GUI.

SUMMARY

The illustrative embodiments provide a method, system, and computer program product. An embodiment of a computer-implemented method includes receiving a presentation document. In the embodiment, the presentation document specifies a graphical layout of a user interface. The embodiment further includes extracting, by a processor, a first user interface graphical feature from the presentation document. The embodiment further includes matching the extracted first user interface graphical feature to one or more first candidate user interface graphical features to determine a first selected candidate user interface graphical feature. The embodiment further includes synthesizing a user interface code representation of the user interface based upon the first selected candidate user interface graphical feature.

In another embodiment, the user interface graphical feature includes a user interface graphical element. In another embodiment, the user interface graphical feature includes a widget. In another embodiment, the user interface graphical feature includes a graphical element property associated with the user interface graphical element.

In another embodiment, the presentation document illustrates the graphical element within the graphical layout.

In another embodiment, the user interface code representation is configured to implement the user interface including the selected candidate user interface graphical feature in a manner that is consistent with the graphical layout specified in the presentation document.

In another embodiment, the one or more first candidate user interface graphical features are stored within a library associated with a development environment. In another embodiment, each first candidate user interface graphical feature in the library is associated with computer code configured to implement the user interface graphical feature in the user interface using the development environment.

In another embodiment, determining the first selected candidate user interface graphical feature includes determining that the first user interface graphical feature matches the first selected candidate user interface graphical feature within a predetermined threshold range.

In another embodiment, the matching of the extracted first user interface graphical feature to the one or more first candidate user interface graphical features is performed using a computer vision processing.

Another embodiment further includes extracting a second user interface graphical feature from the presentation document, and determining that the extracted second user interface graphical feature does not match one or more second candidate user interface graphical features within a predetermined threshold range. The another embodiment further includes receiving a selection from a user of a second selected candidate user interface graphical feature from one or more of the second candidate user interface graphical features. The another embodiment further includes synthesizing a second user interface code representation based upon the second selected candidate user interface graphical feature.

In another embodiment, the user interface code representation include computer code configured to be executed by a device to implement the user interface.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
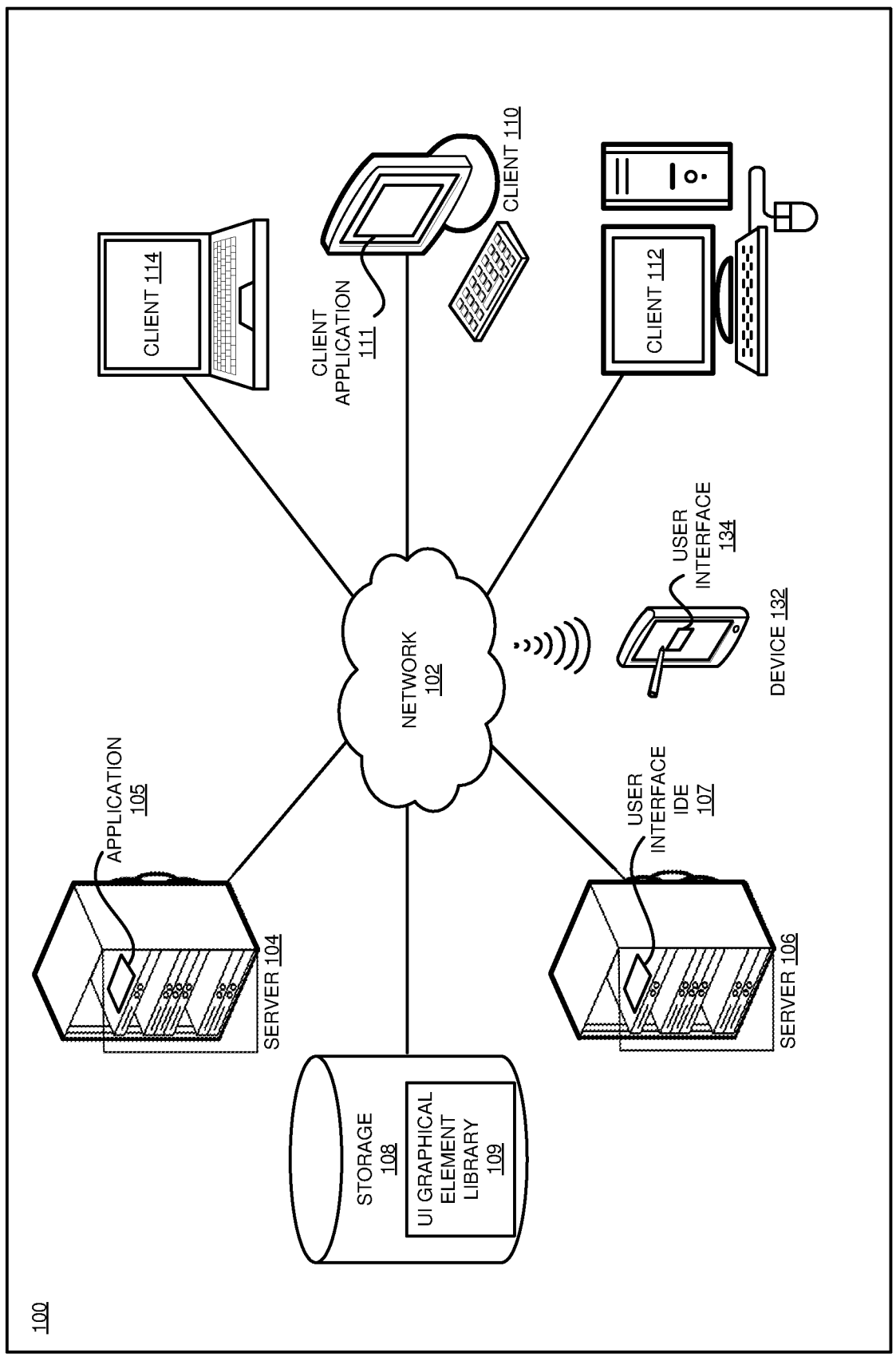
FIG. 1 depicts a block diagram of a network of data processing systems in which illustrative embodiments may be implemented.

The illustrative embodiments described herein are directed to for user interface synthesis based upon extracted presentation document graphical features. Embodiments recognize that graphical user interface (GUI) designers are responsible for designing GUIs having favorable user interactions and user experiences when manipulated by a user. Embodiments further recognize that designers often occupy a different occupational space than that of developers that are responsible for coding the GUI to realize the GUI designed by the designer. Embodiments recognize that designers often have different skills, different tools, and different priorities than that of developers. Embodiments recognize that many software applications are often critically dependent upon favorable user interactions and user experiences provided by the GUI such as applications for mobile devices which typically have smaller display areas.

Various embodiments recognize the existence of a gap between development environments between UI designers and developers as designers often develop the UI in one development environment while developers implement the UI in another development environment. For example, UI designers often provide illustrations of the graphical elements of a GUI within a presentation document generated with a presentation application, and UI developers often code the UI designed by the designer using a programming environment such as an IDE. A designers may not be a programmer, may not use or be familiar with tools for coding of GUIS, and may not have technical knowledge regarding about programming GUIs.

An embodiment is directed to synthesizing of a user interface by receiving, by a system, a presentation document specifying a user interface for a given screen or an application. In a particular embodiment, a developer uses a drag-and-drop interface of a presentation application to design a graphical user interface by placing user interface graphical elements or other graphical features onto one or more slides of the presentation document. In a particular embodiment, a graphical element may include graphical user interface elements such as, but not limited to widgets, icons, sliders, font styles, or buttons. In a particular embodiment, each graphical feature may also include one or more associated graphical feature properties such as, but not limited to, a font size of a font or a color of a graphical element. In the particular embodiment, the developer provides the presentation document to the system.

In the embodiment, the system extracts graphical elements and/or other graphical features, from the presentation document using one or more known machine-learning graphical feature extraction algorithms or techniques. In the embodiment, the system matches the extracted graphical elements or features to candidate graphical elements or features in an available graphical element library. In particular embodiments, each candidate graphical element or feature in the graphical element library is associated with computer code to implement the graphical element or feature in a GUI using an IDE. In a particular embodiment, the system determines whether an extracted graphical element or feature matches the candidate graphical element or feature using computer vision or other known graphical feature matching algorithms or techniques.

In the embodiment, if the system determines that an extracted graphical element or feature has a sufficiently significant match to a graphical element or feature in the library (e.g., within a threshold value of matching), the system synthesizes code to implement a graphical user interface including the graphical element or feature in a manner that is consistent with the graphical element layout and graphical element properties specified in the presentation document. In a particular embodiment, the system utilizes an application programming interface (API) to cause a GUI development application associated with an IDE to automatically synthesize the code to implement the graphical user interface.

In an embodiment, if the system determines that no sufficient match is found between the extracted graphical feature and the candidate graphical feature (e.g., not within the threshold value of matching), the system prompts a user to select a candidate graphical element or feature from a choice of a number of most closely matching candidate graphical features, receive the selection from the user, and synthesizes code to implement a graphical user interface including the selected graphical element feature.

One or more embodiments described herein may provide one or more advantages or benefits of bridging the gap between designers and developers of user interfaces, mitigate consequences of UI acceptance testing, and improving productivity.

An embodiment can be implemented as a software application. The application implementing an embodiment can be configured as a modification of an existing user interface development environment or platform, as a separate application that operates in conjunction with an existing interface development environment or platform, a standalone application, or some combination thereof.

The illustrative embodiments are described with respect to certain types of development tools and platforms, procedures and algorithms, services, devices, data processing systems, environments, components, graphical elements, graphical features, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
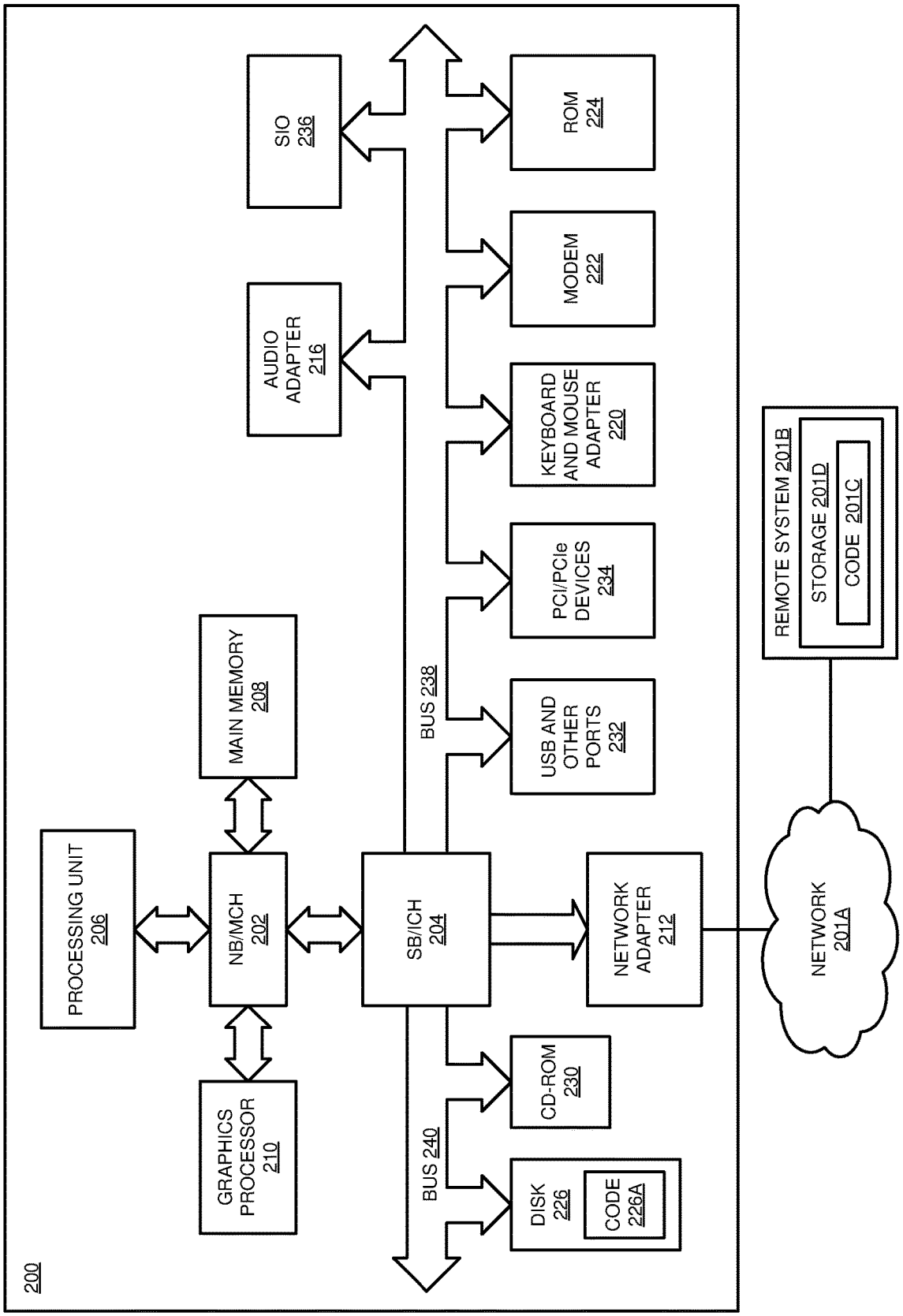
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage device 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon. Client 110 includes a client application 111 providing a user interface to allow a designer to generate a presentation document using a presentation application as described with respect to one or more embodiments.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Device 132 includes a user interface 134 within a display of device 132 in which user interface 134 is implemented by computer code generated from a presentation document specifying a GUI as described herein with respect to one or more embodiments. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Servers 104 and 106, storage device 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown. Server 104 includes an application 105 that may be configured to implement one or more of the functions described herein for user interface synthesis based upon extracted presentation document graphical features in accordance with one or more embodiments.

Server 106 includes a user interface IDE 107 configured to generate computer code for implementing a GUI using a developer application as described herein with respect to various embodiments. Storage device 108 includes a UI graphical element library 109 configured to store candidate graphical features such as graphical elements as described herein.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as device 132 or server 104 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
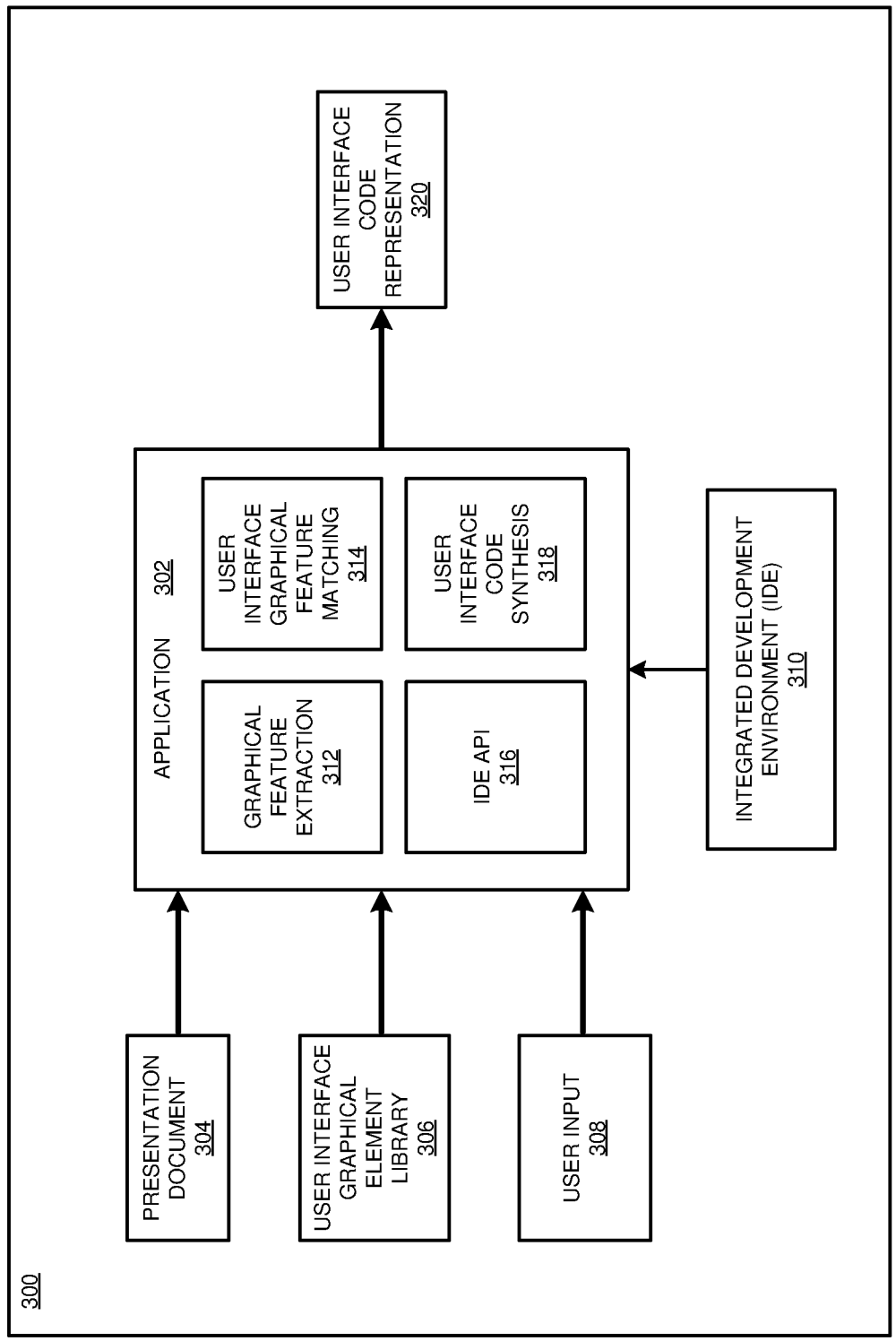
FIG. 3 depicts a block diagram of an example configuration for user interface synthesis based upon extracted presentation document graphical features in accordance with an illustrative embodiment.

With reference to FIG. 3, this figure depicts a block diagram of an example configuration 300 for user interface synthesis based upon extracted presentation document graphical features in accordance with an illustrative embodiment. The example embodiment includes an application 302. In a particular embodiment, application 302 is an example of application 105 of FIG. 1.

Application 302 receives a presentation document 304 including a specification of a graphical layout of a user interface including one or more user interface graphical features for an application. In one or more embodiments, the user interface graphical features include user interface graphical elements (e.g., widgets) and/or one or more graphical element properties (e.g., a color or font size). Application 302 is in communication with a user interface graphical element library 306 including one or more candidate graphical features such as candidate graphical elements. In a particular embodiment, UI graphical element library 306 is an example of UI graphical element library 109 of FIG. 1.

Application 302 further receives a user input 308 indicative of a user selection of a candidate UI graphical feature as described herein with respect to one or more embodiments. Applicant 302 is in further communication with an integrated development environment (IDE) 310 configured to generated computer code for implementing a GUI responsive to an API call from application 302 in one or more embodiments.

Application 302 includes a graphical feature extraction component 312, a user interface graphical feature matching component 314, an IDE API 316, and a user interface code synthesis component 314. In the embodiment, graphical feature extraction component 312 is configured to extract one or more graphical features, such as user interface graphical elements and/or graphical properties, from presentation document 304. UI graphical feature matching component 314 is configured to match the one or more extracted graphical features with one or more candidate graphical features from UI graphical element library 306 and select the one or more matching candidate graphical features corresponding to the extracted graphical features to implement a GUI corresponding to the graphical layout specified by presentation document 304.

IDE API 316 includes an API configured to allow application 302 to issue calls to IDE 310. UI code synthesis component 318 is configured to issue one or more calls to IDE 310 using IDE API 316 to generate a user interface code representation representative of computer code to implement the GUI corresponding to presentation document 304. In a particular embodiment, user interface code representation includes computer code configured to execute within an application of device 132 of FIG. 1.

Figure 4:
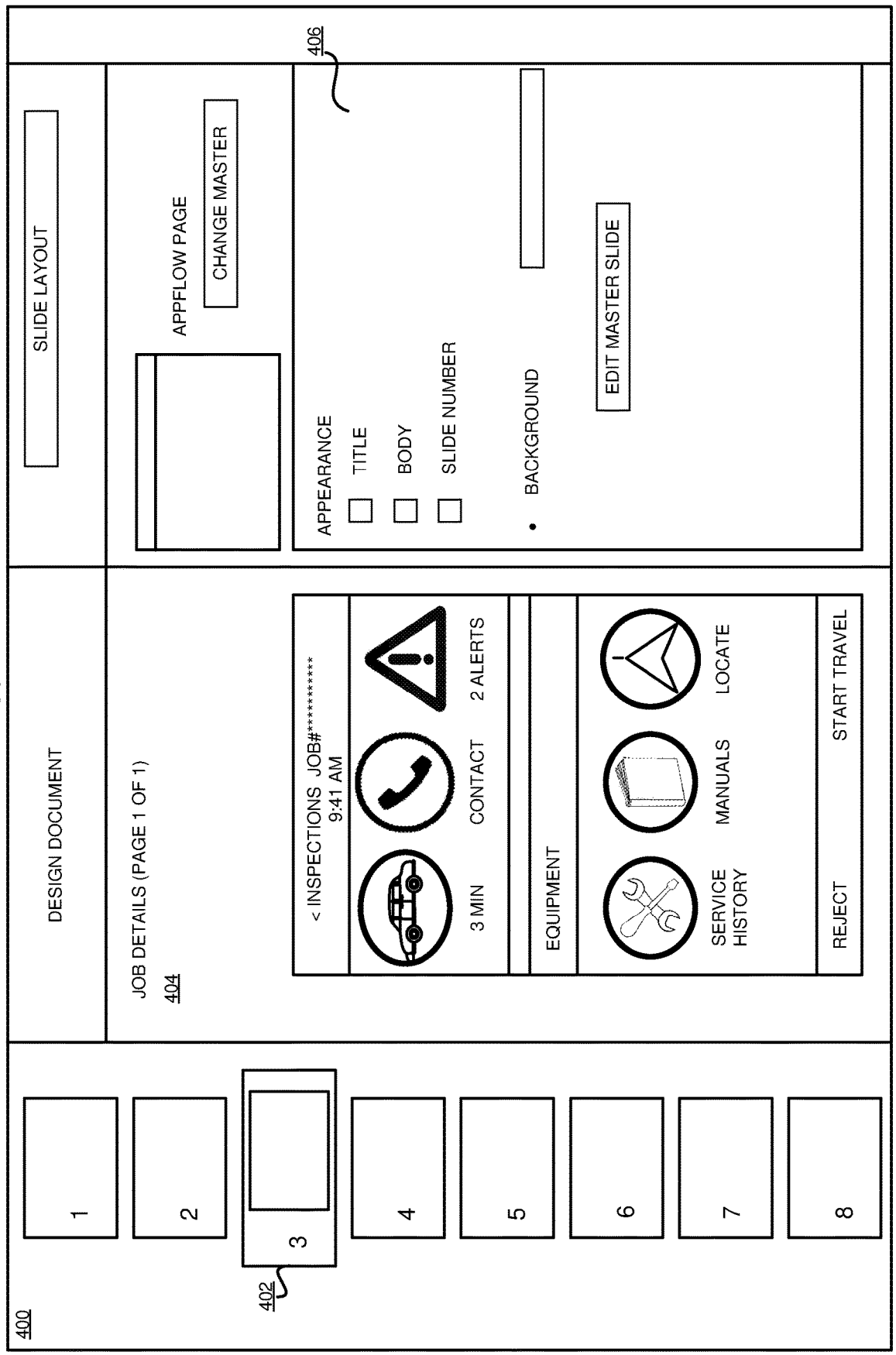
FIG. 4 depicts an example design document interface for creating a presentation document in accordance with an illustrative embodiment.

With reference to FIG. 4, this figure depicts an example design document interface 400 for creating a presentation document in accordance with an illustrative embodiment. Design document interface 400 includes a number of slides 402 in which a particular slide is selected to show a GUI design area 404. GUI design area 404 includes a graphical layout including UI graphical elements for a UI interface placed by a designer. Design document interface 400 further includes a configuration portion 406 for a slide layout of the slide allowing for configuration of the appearance of the slide such as a title, body, slide number, or background image.

Figure 5:
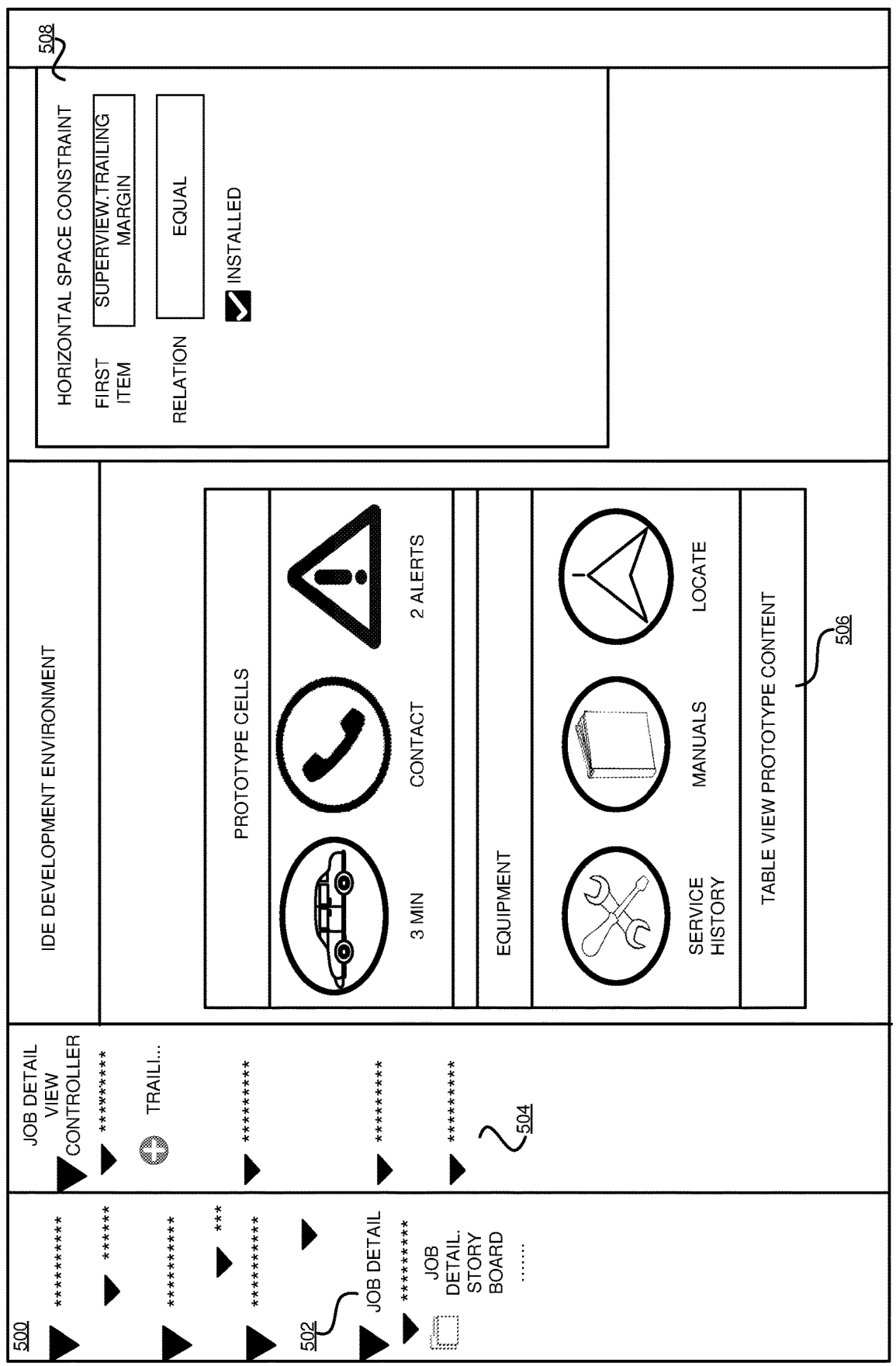
FIG. 5 depicts an example IDE development environment for generating computer code for implementing a GUI in accordance with an illustrative embodiment.

With reference to FIG. 5, this figure depicts an example IDE development environment 500 for generating computer code for implementing a GUI in accordance with an illustrative embodiment. IDE development environment 500 includes a job detail selection portion 502 which selects a job detail view controller portion 504. Selection of a particular portion job detail view controller portion displays a GUI code development portion 506 configured to allow a developer to generate code to implement a GUI. IDE development environment 500 further includes a configuration portion 508 to allow configuration of operation of the GUI.

Figure 6:
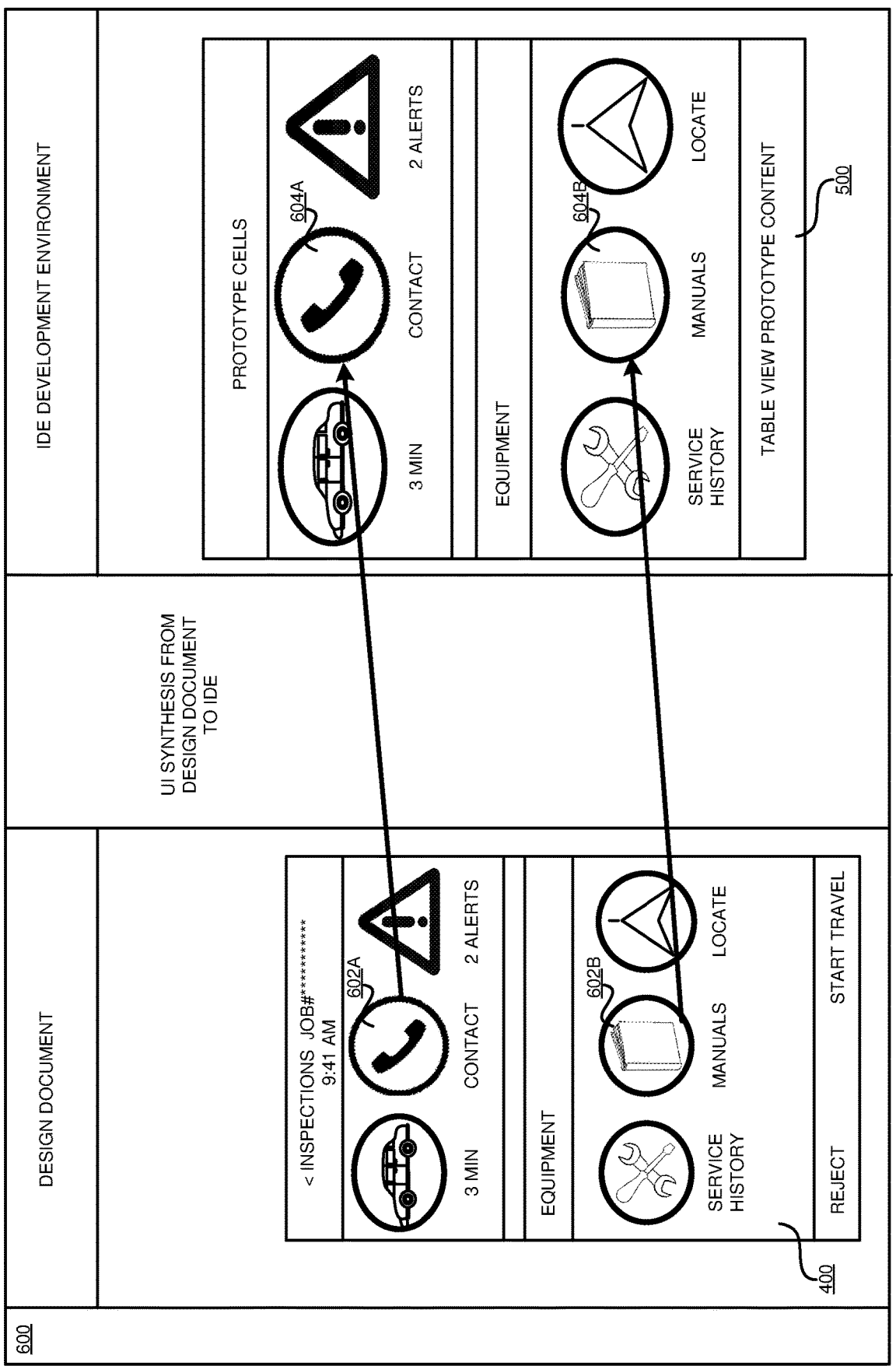
FIG. 6 depicts an example UI synthesis from a design document to an IDE in accordance with an illustrative embodiment.

With reference to FIG. 6, this figure depicts an example UI synthesis 600 from a design document to an IDE in accordance with an illustrative embodiment. In the example of FIG. 6, graphical elements of design document 400 of FIG. 4 is synthesized as code for implemented an GUI by IDE 500 of FIG. 5 in accordance with a procedure for user interface synthesis based upon extracted presentation document graphical features as described herein with respect to various embodiments. In the example of FIG. 6, a first graphical feature 602A illustrated within design document 400 is extracted as a UI graphical feature, matched to a candidate graphical feature from a UI graphical element library, and implemented by computer code of a GUI as a second graphical feature 604A within IDE 500 with a graphical layout and appearance that is the same or similar to that of first graphical feature 602A. Similarly, a third graphical feature 602B illustrated within design document 400 is extracted as a UI graphical feature, matched to a candidate graphical feature from the UI graphical element library, and implemented by computer code of a GUI as a fourth graphical feature 604B within IDE 500 with a graphical layout and appearance that is the same or similar to that of third graphical feature 602B.

Figure 7:
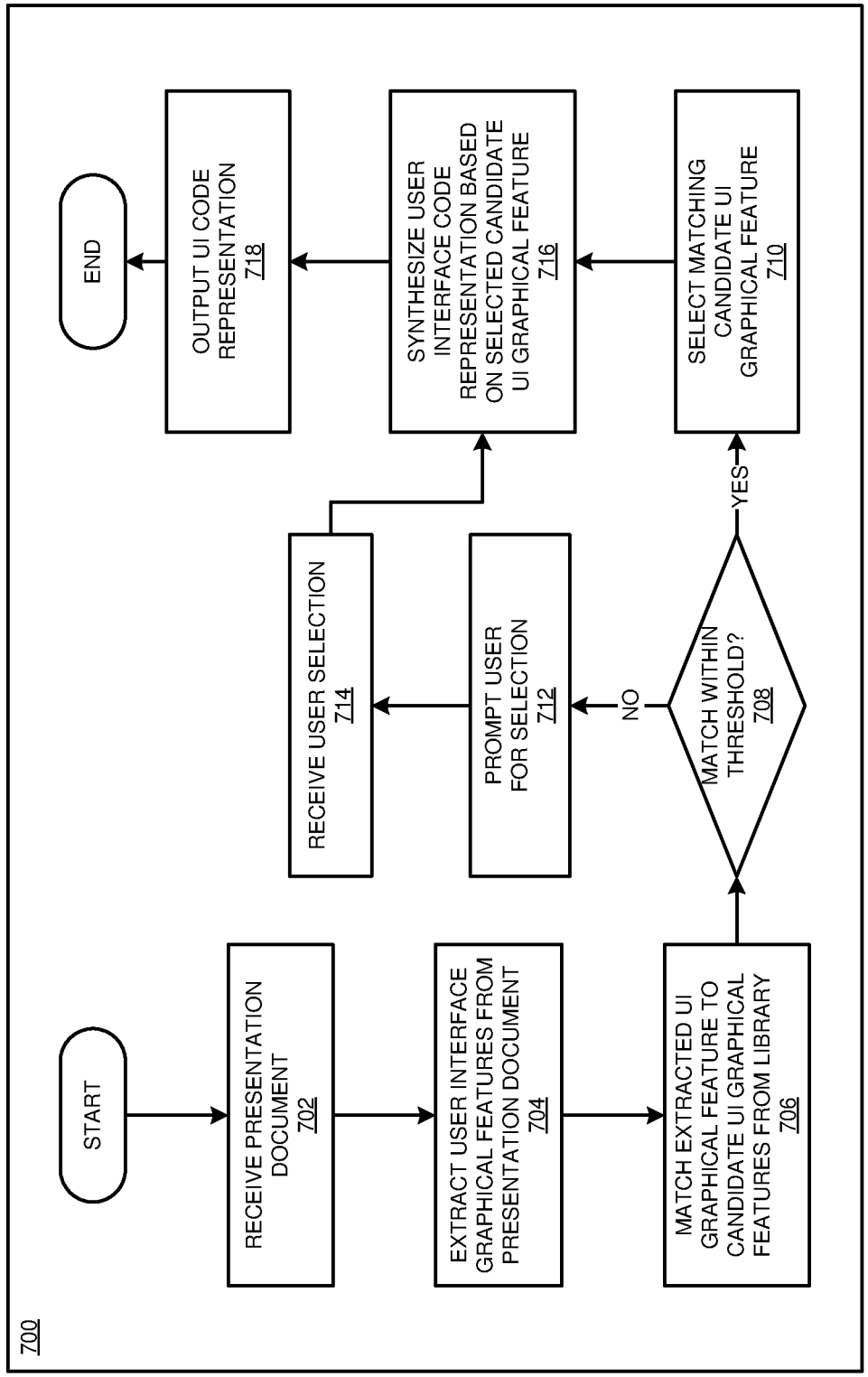
FIG. 7 depicts a flowchart of an example process for user interface synthesis based upon extracted presentation document graphical features in accordance with an illustrative embodiment.

With reference to FIG. 7, this figure depicts a flowchart of an example process 700 for user interface synthesis based upon extracted presentation document graphical features in accordance with an illustrative embodiment. In block 702, application 105 receives a presentation document specifying and/or illustrating a graphical layout of a user interface for a screen or an application. In block 704, application 105 extracts one or more user interface graphical features from the presentation document. In a particular embodiment, a UI graphical feature includes a UI graphical element such as a widget. In another particular embodiment, a UI graphical feature includes a graphical element property associated with a graphical element specified in the presentation document such as a color of the UI graphical element, a font type of the UI graphical element, or a font size of the UI graphical element.

In block 706, application 105 matches the extracted graphical features to one or more candidate UI graphical features in a graphical features library. In particular embodiments, each candidate graphical feature in the graphical element library is associated with computer code to implement the graphical feature in a GUI using an IDE. In a particular embodiment, the system determines whether an extracted graphical element or feature matches the candidate graphical element or feature using computer vision processing or other known graphical feature matching algorithms or techniques.

In block 708, application 105 determines whether the extracted UI graphical feature matches a candidate graphical feature within a predetermined threshold range or value. If application 105 determines that the extracted graphical feature matches the candidate graphical feature in the library within the predetermined threshold range or value, process 700 continues to block 710. In block 710, application 105 selects the matching candidate UI graphical feature as the selected candidate UI graphical feature and process 700 continues to block 716.

If application 105 determines that the extracted graphical feature does not match a candidate graphical feature in the library within the predetermined threshold range or value, process 700 continues to block 712. In block 712, application 105 prompts a user to select a candidate graphical feature from a choice of a number of most closely matching candidate graphical features and process 700 continues to block 714. In block 714, application 105 receives the selection of a candidate graphical feature from the user and process 700 continues to block 716.

In block 716, application 105 synthesizes (or generates) a UI code representation based on the selected candidate UI graphical feature to implement a GUI including the graphical feature in a manner that is consistent with the graphical layout and/or graphical element properties specified or illustrated in the presentation document. In a particular embodiment, application 105 utilizes an API to cause a GUI development application associated with an IDE to automatically synthesize the code to implement the graphical user interface. In block 718, application 105 outputs the UI code representation. In a particular embodiment, the UI code representation includes computer code configured to be executed by a processor of a device to implement the GUI. Process 700 then ends. In one or more embodiments blocks 704-718 are repeated for each UI graphical features of the presentation document.

Thus, a computer implemented method, system or apparatus, and computer program product are provided in the illustrative embodiments for user interface synthesis based upon extracted presentation document graphical features and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   receiving a presentation document, the presentation document specifying a graphical layout of a user interface;
   extracting, by a processor, a first user interface graphical feature from the presentation document;
   matching the extracted first user interface graphical feature to one or more first candidate user interface graphical features to determine a first selected candidate user interface graphical feature; and
   synthesizing a user interface code representation of the user interface based upon the first selected candidate user interface graphical feature.

2. The computer-implemented method of claim 1, wherein the user interface graphical feature includes a user interface graphical element.

3. The computer-implemented method of claim 2, wherein the user interface graphical feature includes a widget.

4. The computer-implemented method of claim 2, wherein the user interface graphical feature includes a graphical element property associated with the user interface graphical element.

5. The computer-implemented method of claim 1, wherein the presentation document illustrates the graphical element within the graphical layout.

6. The computer-implemented method of claim 1, wherein the user interface code representation is configured to implement the user interface including the selected candidate user interface graphical feature in a manner that is consistent with the graphical layout specified in the presentation document.

7. The computer-implemented method of claim 1, wherein the one or more first candidate user interface graphical features are stored within a library associated with a development environment.

8. The computer-implemented method of claim 7, wherein each first candidate user interface graphical feature in the library is associated with computer code configured to implement the user interface graphical feature in the user interface using the development environment.

9. The computer-implemented method of claim 1, wherein determining the first selected candidate user interface graphical feature includes determining that the first user interface graphical feature matches the first selected candidate user interface graphical feature within a predetermined threshold range.

10. The computer-implemented method of claim 1, wherein the matching of the extracted first user interface graphical feature to the one or more first candidate user interface graphical features is performed using a computer vision processing.

11. The computer-implemented method of claim 1, further comprising:
    extracting a second user interface graphical feature from the presentation document;
    determining that the extracted second user interface graphical feature does not match one or more second candidate user interface graphical features within a predetermined threshold range;
    receiving a selection from a user of a second selected candidate user interface graphical feature from one or more of the second candidate user interface graphical features; and
    synthesizing a second user interface code representation based upon the second selected candidate user interface graphical feature.

12. The computer-implemented method of claim 1, wherein the user interface code representation include computer code configured to be executed by a device to implement the user interface.

13. A computer usable program product comprising one or more computer-readable storage devices, and program instructions stored on at least one of the one or more storage devices, the stored program instructions comprising:

program instructions to receive a presentation document, the presentation document specifying a graphical layout of a user interface;

program instructions to extract a first user interface graphical feature from the presentation document;

program instructions to match the extracted first user interface graphical feature to one or more first candidate user interface graphical features to determine a first selected candidate user interface graphical feature; and program instructions synthesize a user interface code representation of the user interface based upon the first selected candidate user interface graphical feature.

14. The computer usable program product of claim 13, wherein the user interface graphical feature includes a user interface graphical element.

15. The computer usable program product of claim 14, wherein the user interface graphical feature includes a widget.

16. The computer usable program product of claim 14, wherein the user interface graphical feature includes a graphical element property associated with the user interface graphical element.

17. The computer usable program product of claim 13, wherein the presentation document illustrates the graphical element within the graphical layout.

18. The computer usable program product of claim 13, wherein the computer usable code is stored in a computer readable storage device in a data processing system, and wherein the computer usable code is transferred over a network from a remote data processing system.

19. The computer usable program product of claim 13, wherein the computer usable code is stored in a computer readable storage device in a server data processing system, and wherein the computer usable code is downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to receive a presentation document, the presentation document specifying a graphical layout of a user interface;

program instructions to extract a first user interface graphical feature from the presentation document;

program instructions to match the extracted first user interface graphical feature to one or more first candidate user interface graphical features to determine a first selected candidate user interface graphical feature; and program instructions synthesize a user interface code representation of the user interface based upon the first selected candidate user interface graphical feature.

\* \* \* \* \*